United States Patent

[11] 3,598,905

[72] Inventors Buran I. Keprta, Jr.
Norristown;
Sylvester Walczak, Jr., Warminster, both of, Pa.

[21] Appl. No. 14,090
[22] Filed Feb. 25, 1970
[45] Patented Aug. 10, 1971
[73] Assignee Philco-Ford Corporation
Philadelphia, Pa.

[54] WHITE-BALANCE SERVICING CIRCUIT
11 Claims, 2 Drawing Figs.

[52] U.S. Cl. .......... 178/5.4 TE
[51] Int. Cl. .......... H04n 9/20
[50] Field of Search .......... 178/5.4 TE, 5.4 R

[56] References Cited
UNITED STATES PATENTS

| | | | |
|---|---|---|---|
| 3,114,794 | 12/1963 | Stark et al. | 178/5.4 TE |
| 3,114,796 | 12/1963 | Stark et al. | 178/5.4 TE |
| 3,270,125 | 8/1966 | Kelley et al. | 178/5.4 TE |
| 3,309,459 | 3/1967 | Donigian | 178/5.4 TE |
| 3,419,673 | 12/1968 | Swaine | 178/5.4 TE |
| 3,461,225 | 8/1969 | Crookshanks et al. | 178/5.4 TE |
| 3,525,801 | 8/1970 | Willis | 178/5.4 TE |

*Primary Examiner*—Robert L. Griffin
*Assistant Examiner*—John C. Martin
*Attorney*—Herbert Epstein

ABSTRACT: A switching circuit for alternatively conditioning a color television receiver to display images on the screen of its picture tube or to permit accurate adjustment of biases controlling the white balance of the image displayed by the picture tube.

Figures 1, 2:
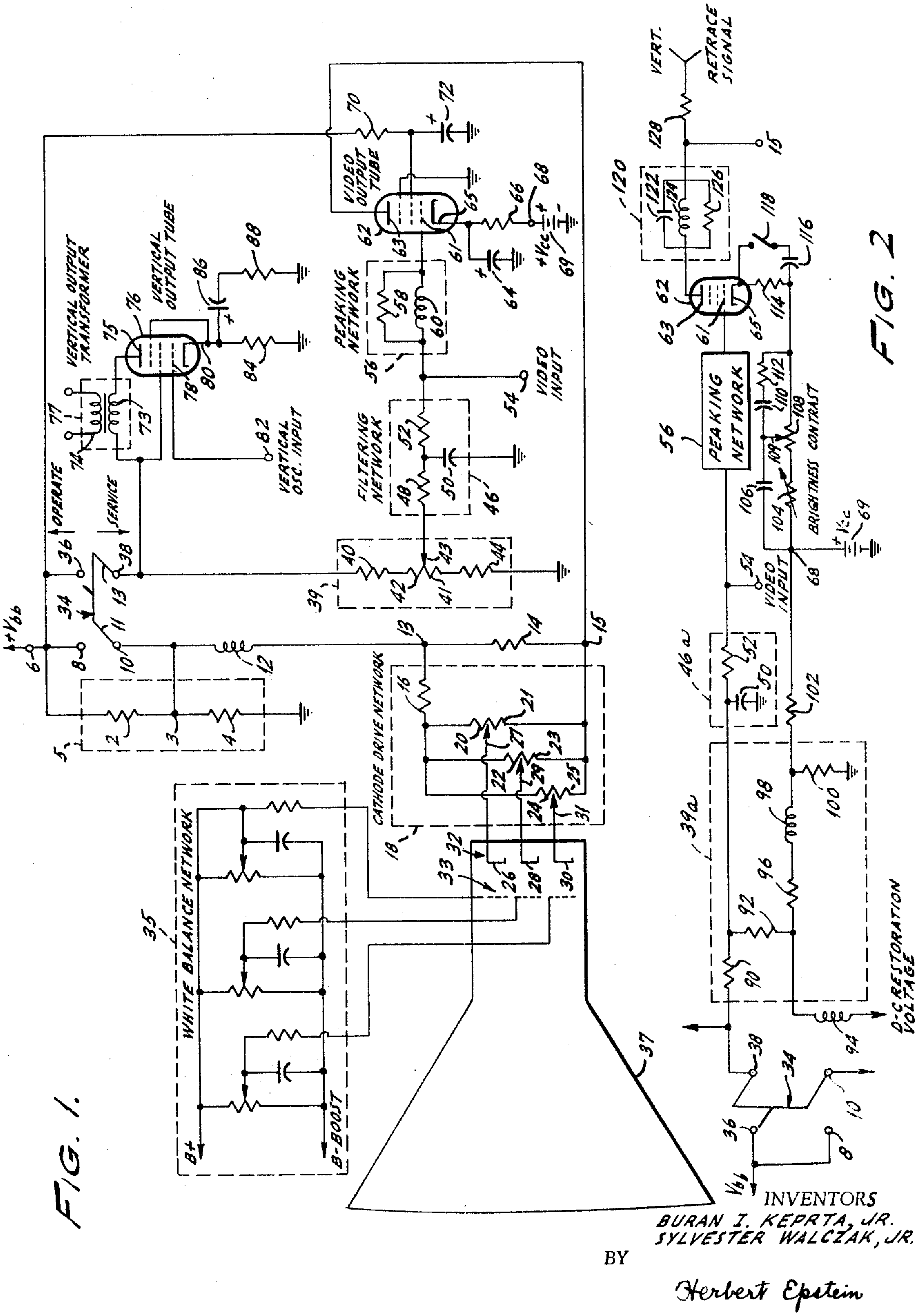

The circuit comprises a double-pole single-throw switch so interconnected with sources of operating voltages for the vertical deflection output tube, the video output tube, and the picture tube, that, when the switch is thrown to its "service" position, i.e. is opened, the receiver is conditioned simultaneously in three ways: (1) plate voltage is removed from the vertical deflection output tube of the receiver, thereby cutting off that tube and preventing vertical deflection of the cathode-ray beams on the picture tube; (2) a bias voltage sufficient to cut off the video output tube is applied to a grid thereof, thereby blocking transmission of the video signal to the picture tube; and (3) a reference black level bias voltage is applied to each of the three kinescope cathodes. When the receiver is so conditioned, the white balance of the image displayed by the picture tube can be accurately set by adjusting the biases supplied to the screen grids of the picture tube.

When the double-pole single-throw switch is thrown to its "operate" position, i.e. is closed, normal operating voltages are restored to the receiver, thereby enabling it to reproduce color television pictures.

PATENTED AUG 10 1971

3,598,905

INVENTORS
BURAN I. KEPRTA, JR.
SYLVESTER WALCZAK, JR.
BY
Herbert Epstein
ATTORNEY

WHITE-BALANCE SERVICING CIRCUIT

BACKGROUND OF THE INVENTION

This invention relates to servicing circuitry for color television receivers employing picture tubes having plural electron guns, e.g., "shadow mask" tubes, and more particularly, to a circuit for conditioning such a receiver so that the individual screen grid voltages of its several electron guns can be adjusted to give each electron gun the same control grid-cathode cutoff characteristic as the other guns, thereby providing good white balance in the reproduced image.

To condition the receiver for making this adjustment, it is necessary to (1) prevent transmission of video signals to the picture tube cathodes, (2) apply to each of the cathodes a reference black-level voltage, whose value is independent of adjustments to cathode drive potentiometers made to account for differences between the electron guns (due, for example, to variations in phosphor efficiencies and cathode emission characteristics), and (3) disable the receiver vertical deflection circuitry, thereby permitting fine adjustment of the cutoff potential of each gun. One servicing circuit used heretofore to condition color television receivers for white balance adjustment employs a double-pole double-throw servicing switch which, when thrown to its "service" position, is intended to interrupt transmission of video signals to the picture tube by disconnecting the picture tube cathodes from the plate load resistor of the video output tube. In addition, it provides a reference black-level voltage independent of cathode drive adjustments by applying the same constant voltage to both fixed terminals of each cathode drive adjusting potentiometer, and prevents generation of the vertical-deflection signal by short circuiting the vertical oscillator output signal to ground at the input of the vertical output stage.

This prior-art circuit is disadvantageous because it permits a portion of the video output signal to reach the cathodes of the picture tube. Such portion can reach the picture tube cathodes because the video output tube is not cut off when the service switch is in its "service" position, but to the contrary continues to produce a video output signal at its plate. That signal is coupled to the picture tube cathodes by the capacitance of the service switch when the service switch is in "service" position. Because such portion may vary markedly the beam currents of the three beams of the picture tube (and hence the light output of the image screen impinged by those beams), and because the serviceman requires substantially constant light output from the picture tube screen to be able to adjust accurately the white balance of the tube, it may become virtually impossible for the serviceman to adjust properly the screen voltages of the three electron guns to achieve white balance.

Another disadvantage of the prior-art circuit is that the capacitance added to the plate circuit of the video output tube both by the service switch (even when thrown to its "operating" position) as well as by wires connected to the switch, degrades high frequency video performance during normal receiver operation. To minimize such degradation, the control switch must be mounted as close to the video output stage as possible while still remaining accessible to servicemen. These dual requirements often necessitate the use of a switch which is mechanically complicated and relatively expensive.

Accordingly, an object of this invention is to provide an improved white-balance servicing circuit for color television receivers.

Another object is to provide a white-balance servicing circuit which, when conditioning the receiver for white-balance adjustment, removes practically all video information from the picture tube cathodes.

Another object is to provide a white-balance servicing circuit which does not degrade high frequency video performance.

Another object is to provide a white-balance servicing circuit in which the position of the servicing switch is not critical.

Another object is to provide a white-balance servicing circuit in which a cheap servicing switch can be used.

DRAWING

FIG. 1 of the drawing is a schematic diagram of one white-balance servicing circuit according to the invention.

FIG. 2 of the drawing is a schematic diagram of a portion of another white-balance servicing circuit according to the invention.

DESCRIPTION OF CIRCUIT

Color television receiver components with which the white-balance servicing circuit of the invention is associated include a three-gun color television picture tube 37, a white-balance network 35 for adjusting the biasing voltage of each of the three screen grids 33 of tube 37, a vertical output tube 76 for supplying a vertical deflection signal to the vertical deflection yoke (not shown) associated with picture tube 37, a video output tube 62 for producing a video output signal, and a cathode drive network 18 for distributing the video output signal produced by tube 62 to the three picture tube cathodes 26, 28 and 30 referred to collectively as 32.

In accordance with the invention, the white-balance servicing circuit comprises a double-pole single-throw (DPST) service switch 34 for switching the receiver between "operate" and "servicing" conditions, connected as set forth hereinafter. Switch 34 comprises movable blades 11 and 13 which are electrically insulated from one another and mechanically coupled to move together. Terminals 10 and 38 afford electrical connections to blades 11 and 13 respectively. Switch 34 also comprises fixed contacts 8 and 36 adapted to make electrical connection with blades 11 and 13 when the latter are closed thereto.

Terminals 8 and 36 of switch 34 are both connected to a source of positive bias voltage $V_{bb}$ at a supply terminal 6. Supply terminal 6 also is connected to a point at reference potential, shown in the described embodiment as ground, by series-connected resistors 2 and 4 forming a first voltage divider network 5. The junction 3 between resistors 2 and 4 is connected to terminal 10 of service switch 34. A shunt peaking coil 12 connects terminal 10 to a first video supply terminal 13 of cathode drive network 18. Network 18 comprises three potentiometers 20, 22 and 24 whose resistance elements 21, 23 and 25 respectively are connected in shunt and whose variable arms 27, 29 and 31 respectively are connected to the cathodes 26, 28 and 30 respectively of picture tube 37. One terminal of each of elements 21, 23 and 25 is connected to video supply terminal 13 by a resistor 16, and the other terminal of each of those elements is connected to a second video supply terminal 15. Terminal 15, in turn, is directly connected to the plate 63 of video output tube 62. A plate load resistor 14 for tube 62 is connected between video supply terminals 13 and 15.

Terminal 38 of service switch 34 is connected to ground by a second voltage divider network 39 comprising a resistor 40, the resistance element 41 of a brightness control potentiometer 42, and a resistor 44, all connected in series. The variable arm 43 of potentiometer 42 is conductively connected to control grid 61 of video output tube 62 by a low-pass filtering network 46 comprising series-connected resistors 48 and 52 and a capacitor 50 connecting the junction of resistors 48 and 52 to ground, and by a video peaking network 56 comprising a resistor 58 connected in parallel with an inductor 60. Network 46 is constructed and arranged selectively to pass a bias voltage from arm 43 to peaking network 56 while blocking transmission of video signals to arm 43 from the junction 53 of peaking network 56 and filtering network 46. An input terminal 54 is provided for supplying to junction 53 the video input signal from preceding video amplifiers (not shown) of the receiver. Cathode 65 of video output tube 62 is connected to terminal 68 by a biasing resistor 66, and to ground by bypass capacitor 64. A source of constant, unidirectional cathode bias $V_{cc}$, positive with respect to ground potential, illustrated in the drawings as a battery 69, is connected to terminal 68.

Terminal 38 of service switch 34 is also connected to plate 75 of vertical output tube 76 by the primary winding 73 of a vertical output transformer 77. The secondary winding 74 of transformer 77 is connected to the vertical deflection yoke (not shown). An input terminal 82 for supplying a vertical oscillator signal is connected to control grid 78 of vertical output tube 76.

Cathode 80 of vertical output tube 76 is connected to ground by a biasing resistor 84 and the series combination of a bypass capacitor 86 and a convergence pickoff resistor 88.

Alternative circuitry for biasing video output tube 62 is shown in FIG. 2. Components shown in FIG. 2 which correspond to components shown in FIG. 1 are designated by the same numerals. In FIG. 2, terminal 15 of cathode drive network 18 is connected to the plate 63 of video output tube 62 by resonant circuit 120 used to prevent color interference. Terminal 38 of service switch 34 is connected to ground by a voltage divider network 39*a* comprising a resistor 90, a resistor 92, a resistor 96, a coil 98, and a resistor 100, all connected in series. The junction between resistor 90 and resistor 92 is conductively connected to control grid 61 of video output tube 62 by low-pass filtering network 46*a* and by video peaking network 56. The junction between resistor 100 and coil 98 is connected to the cathode 65 of video output tube 62 by resistor 102, brightness control potentiometer 104, contrast control potentiometer 108, and resistor 114, all connected in series. The series combination of a picture preference switch 118 and bypass capacitor 116 is connected in shunt with resistor 114. Variable arm 109 of potentiometer 108 is connected to the junction between a resistor 114 and a potentiometer 108 by a resistor 112 and a capacitor 110 connected in series, and to terminal 68 by a bypass capacitor 106.

Exemplary tubes and component and voltage values are listed in the following tabulation. However, different tubes, and components and voltages having different values, can also be used.

TABLE I

Exemplary Voltages, Component Values and Tube Types

| | | | |
|---|---|---|---|
| Voltages | Vbb | +275 volts DC | |
| | Vcc | + 20 volts DC | |
| Tubes | 62 | Type 12GN7 | |
| | 76 | Type 6LU8 | |
| Resistors | 2 | 68 | kilohms |
| | 4 | 220 | kilohms |
| | 14 | 7.5 | kilohms |
| | 16 | 6.8 | kilohms |
| | 40 | 330 | kilohms |
| | 44 | 120 | kilohms |
| | 48 | 680 | kilohms |
| | 52 | 150 | kilohms |
| | 58 | 3.3 | kilohms |
| | 66 | 3.3 | kilohms |
| | 70 | 18 | kilohms |
| | 84 | 1.5 | kilohms |
| | 88 | 330 | ohms |
| | 90 | 1.5 | megohms |
| | 92 | 100 | kilohms |
| | 96 | 4.7 | kilohms |
| | 100 | 470 | ohms |
| | 102 | 1.5 | kilohms |
| | 112 | 100 | ohms |
| | 114 | 15 | ohms |
| | 126 | 6.8 | kilohms |
| | 128 | 33 | kilohms |
| Potentiometers | 20 | 10 | kilohms |
| | 22 | 10 | kilohms |
| | 24 | 10 | kilohms |
| | 42 | 150 | kilohms |
| | 104 | 500 | ohms |
| | 108 | 100 | ohms |
| Capacitors | 50 | 0.01 | microfarad |
| | 64 | 0.1 | microfarad |
| | 72 | 10 | microfarads |
| | 86 | 50 | microfarads |
| | 106 | 250 | microfarads |
| | 110 | 0.0022 | microfarads |
| | 116 | 0.0068 | microfarads |
| | 122 | 8 | picofarads |
| Coils | 12 | 270 | microhenries |
| | 60 | 82 | microhenries |
| | 94 | Radio Frequency Choke | |
| | 98 | 560 | microhenries |

Table I Continued

CIRCUIT OPERATION—FIGS. 1 and 2—SUMMARY

The receiver comprising the aforedescribed circuit is alternatively placed in its operating condition by closing service switch 34, or in its white-balance servicing condition, by opening service switch 34.

In the operating condition, normal operating voltages are supplied via switch 34 to tubes 62 and 76. As a result, tube 76 supplies a vertical deflection signal to the vertical deflection yoke, and tube 62 supplies video information to the picture tube cathodes.

In the servicing condition, plate voltage is removed from tube 76, thereby preventing generation of the vertical deflection signal; video output tube 62 is biased into cutoff, thereby removing video drive from the picture tube cathodes, and the same constant positive bias is applied as a black-level reference voltage by voltage divider 5 to all of the picture tube cathodes 32. Because no video signal appears on cathodes 32, a serviceman can adjust accurately the white balance of tube 37 by appropriate setting of the arms of the three potentiometer of white-balance network 35.

OPERATION OF FIG. 1 CIRCUIT IN THE NORMAL OPERATION CONDITION (SWITCH 34 CLOSED)

Blades 11 and 13 of switch 34 are closed to contacts 8 and 36 respectively, thereby connecting contact 8 to terminal 10 and contact 36 to terminal 38. As a result, supply voltage $V_{bb}$ is applied via primary winding 73 to the plate 75 of vertical output tube 76, and is applied directly to its screen grid. Biasing resistor 84 is selected, in a manner well known to those skilled in the art, to bias vertical output tube 76 into its amplifying state. The vertical oscillator signal, supplied to control grid 78, is amplified by the vertical output tube 76, and is available across the secondary winding 74 of vertical output transformer 77 to drive the picture tube vertical deflection yoke (not shown).

The closing of switch 34 also causes operating voltage to be applied to the plate 63 of video output tube 62 by way of switch blade 11, peaking coil 12 and the shunt combination of cathode drive circuit 18 and load resistor 14. In addition, voltage $V_{bb}$ is applied via switch blade 13 to voltage divider network 39. Grid bias voltage for video output tube 62 is developed at the variable arm 43 of brightness control potentiometer 42 and is supplied to control grid 61 of tube 62 by way of filtering network 46 and peaking network 56. The respective valves of resistors 40 and 44 and resistance element 41, the setting of movable arm 43, and the value of bias voltage $V_{cc}$ are chosen in view of the respective values of supply voltages $V_{bb}$, the plate load comprising resistor 14 and network 18, and cathode resistor 66, to produce at grid 61 a voltage which biases video output tube 62 into its amplifying state. The video input signal supplied at terminal 54 is reproduced by tube 67 in amplified form across resistor 14, and is supplied via resistor 16 to potentiometers 20, 22, and 24 as a video drive signal for cathodes 26, 28 and 30 respectively.

Individual adjustment of cathode drive potentiometers 20, 22 and 24 enables compensation for differences in cathode emission characteristics and phosphor efficiencies among the respective electron guns of picture tube 37.

OPERATION OF FIG. 1 CIRCUIT IN THE SERVICING CONDITION (SWITCH 34 OPEN)

To put the color television receiver into its white-balance servicing condition, switch 34 is opened. Opening service switch 34 disconnects terminal 10 from contact 8 and terminal 38 from contact 36, and thereby produces the following three simultaneous results:

1. Supply voltage $V_{bb}$ no longer is applied to the plate 75 of vertical output tube 76 or to its screen. Consequently, tube 76 is cut off, preventing generation of the vertical deflection output signal across secondary winding 74 of vertical output transformer 77.

2. Supply voltage $V_{bb}$ also is disconnected from second voltage divider network 39, thereby causing the bias potential at the grid 61 of video output tube 62 to become substantially equal to ground potential. Since cathode 65 is maintained by source 69 at a potential positive with respect to ground potential, the potential of grid 61 is negative with respect to that of cathode 65. In accordance with the invention, the value of the voltage $V_{cc}$ supplied by source 69 is made sufficiently high to cause cutoff of video output tube 62 when grid 61 is at ground potential. Because tube 62 is cut off, transmission of the video signal from terminal 54 to plate 62 and cathode drive network 18 is blocked. Moreover, no direct current for plate 62 flows through network 18 or resistor 14.

3. Supply voltage $V_{bb}$ is applied across first voltage divider network 5. Since junction 3 thereof is conductively connected to network 18 by coil 12, the voltage at junction 3 is applied to network 18 to provide a reference black level. Since, when video output tube 62 is cut off, no direct current flows through coil 12, resistor 16 or potentiometers 20, 22 and 24, no voltage drops occur thereacross. Therefore, the voltage developed at junction 3 is applied, unchanged in value, to each of cathodes 32 of picture tube 37, regardless of the settings of the movable arms 27, 29 and 31 of cathode drive potentiometers 20, 22 and 24.

Because the opening of switch 34 cuts off tube 62, because the capacitance between grid 61 and plate 62 of tube 62 is extremely low, and because switch 39 is isolated from video frequency signals by low-pass filtering network 46, there is no appreciable feedthrough of video signals to cathodes 32. Hence, when the receiver is conditioned for white-balance servicing by opening switch 34, a serviceman is readily able to obtain excellent white balance in the image reproduced by picture tube 37 by appropriate adjustment of the settings of the movable arms of the potentiometers in white-balance network 35. Since the structure of network 35 may be the conventional one shown in the drawings (see for example U.S. Pat. No. 3,114,792 to J. Stark, Jr. et al. issued Dec. 17, 1963), and the steps for obtaining white balance also may be conventional, neither is described further herein.

Even when switch 34 is closed, so that the plate current of tube 62 flows through blade 11 thereof, no part of switch 34 or the wires connected thereto adds capacitance to any video-frequency-carrying portion of the circuitry associated with tube 62. Consequently, switch 34 need not be mounted near tube 62 (or any other tube), but may be positioned in any desired location. Hence, a cheap switch of uncomplicated structure may be used as switch 34.

In addition, because of the manner in which the networks employed to bias the video output stage and vertical output stage, and to generate reference level voltage are connected to switch 34 and to those stages and picture tube 37, a simpler, cheaper double-pole single-throw control switch may be employed in place of the more expensive and more complicated double-pole double-throw switch used in prior art circuits.

OPERATION OF FIG. 2 CIRCUIT

Operation of the circuit shown in FIG. 2 is similar to the aforedescribed operation of the FIG. 1 circuit. Bias voltage for the grid 61 of video output tube 62 is developed by voltage divider network 39*a*, and is supplied by way of filtering network 46 and peaking network 56. The respective values of resistors 90, 92, 96, 100 and 102, and the value of bias voltage $V_{cc}$ are chosen in view of the respective values of supply voltage $V_{bb}$, the plate load comprising resistor 14 and network 18, and cathode resistors 114, 108, and 104 to produce at grid 61 a voltage which biases video output tube 62 into its amplifying state when switch 34 is closed and into cutoff when switch 34 is opened.

Although the invention has been described with reference to a color television receiver employing vacuum tubes as the active elements in the video output and the vertical output stages, it will be apparent to those skilled in the art that the invention applies equally well to apparatus other than color television receivers, e.g. a color radar display, using a multigun cathode-ray tube, and to circuits using active elements other than vacuum tubes, such as bipolar transistors.

We claim:

1. In an apparatus comprising:

a. a cathode drive network, having first and second input terminals, for supplying signals to a plurality of cathodes of a cathode ray tube, b. first amplifying means having a control electrode and first and second electrodes, said means being responsive to
   i. an operating potential, when applied to said second electrode, to cause flow therethrough of an electric current, and
   ii. variations in a signal, when applied between said control electrode and said first electrode, to vary said electric current flowing through said second electrode, means for applying a deflection input signal between said control electrode and said first electrode, and output means, responsive to current flow through said second electrode produced in response to said deflection input signal, to generate a deflection output signal, c. second amplifying means having a control electrode and first and second electrodes, said second amplifying means being responsive to
   i. variations in a signal, when applied between said control electrode and said first electrode, to vary an electric current flowing through said second electrode thereof when a bias voltage of first value concurrently is applied between said control electrode and said first electrode, and
   ii. a bias voltage of second value, when applied between said control element and said first electrode, to cut off flow of said electric current through said second electrode thereof, video input means for applying a video signal between said control electrode and said first electrode of said second amplifying means, means connecting said second electrode of said second amplifying means to said first input terminal of said cathode drive network, first direct-current-conductive impedance means having finite resistance to the flow therethrough of constant undirectional electric current, and means directly connecting said first direct-current-conductive impedance means between said first and second input terminals of said cathode drive network, the improvement comprising:

d. first and second switching means, each having a first terminal, a second terminal, and means for permitting direct-current-conduction from said first terminal thereof to said second terminal thereof when said switching means is closed and interrupting said conduction when said switching means is open, and means connecting said first terminal of each of said two switching means to a first source of operating potential, e. first biasing means, connected between said first source of operating potential and said second terminal of said first switching means, for producing a reference voltage at said second terminal of said first switching means when said first switching means is open, f. second direct-current-conductive means connecting said second terminal of said first switching means to said second input terminal of said cathode drive network, and g. second biasing means for (i) applying between said control electrode and said first electrode of said second amplifying means a biasing voltage having said first value when said second switching means is closed and having said second value when said second switching means is open, and (ii) preventing transmission of said video signal from said video input means to said second switching means, said output means comprising third direct-current-conductive means connecting said second terminal of said second switching means to said second electrode of said first amplifying means, for supplying an operating potential to said second electrode of said first amplifying means only when said second switching means is closed.

2. An apparatus according to claim 1 wherein said first biasing means comprises:

a first voltage divider comprising resistive means and having first and second input terminals and an output terminal, means connecting said first input terminal of said first voltage divider to said first source of operating potential, means connecting said second input terminal of said first voltage divider to a point at reference potential, and, means connecting said output terminal of said first voltage divider to said second terminal of said first switching means, said reference voltage being produced at said output terminal when said first switching means is open.

3. An apparatus according to claim 2 wherein said second biasing means has:

a first terminal connected to said second terminal of said second switching means, a second terminal connected to said first electrode of said second amplifying means, an output terminal, and means for applying to said control electrode of said second amplifying means the potential of said output terminal of said second biasing means while preventing transmission of said video signal from said video input to said output terminal of said biasing means.

4. An apparatus according to claim 3 wherein said first voltage divider comprises first and second resistive means connected in series between said first and second input terminals of said first voltage divider, and means connecting said output terminal of said first voltage divider to the junction of said first and second resistive means.

5. An apparatus according to claim 4, wherein said second biasing means comprises a second voltage divider and a bias network, said second voltage comprising third resistive means, a potentiometer having a resistance element and a variable arm, fourth resistive means, and means connecting said third resistive means, said resistance element and said fourth resistive means in series between said first terminal of said second biasing means and said point at reference potential, and means connecting said variable arm of said potentiometer to said output terminal of said second biasing means, and said bias network comprising the series combination of fifth resistive means and a second source of operating potential connected between said second terminal of said second biasing means and said point at reference potential, and capacitive means connected in shunt with said series combination.

6. An apparatus according to claim 5, wherein said cathode drive network comprises a plurality of resistive means for individually varying the amplitude of the cathode drive signal supplied to each of said cathodes when said first and second switching means are both closed.

7. An apparatus according to claim 6 wherein said video input means comprises a peaking network including resistive means and inductive means connected in shunt relationship and to said control electrode of said second amplifying means, said means for supplying to said control electrode of said second amplifying means the potential of said output terminal of said second biasing means comprises a low pass filter connected between said output terminal of said second biasing means and said peaking network, said output mans for generating a deflection output signal comprises a transformer, said first direct-current-conductive impedance means comprises resistive means, said second direct-current-conductive means comprises inductive means, and said third direct-current-conductive means comprises a winding of said transformer.

8. An apparatus according to claim 7, comprising means for ganging said first and second switching means.

9. An apparatus according to claim 1 wherein each one of said first and second amplifying means comprises an electron discharge tube having a control grid, a cathode, and a plate, said control grid, said cathode, and said plate being respectively said control electrode, said first electrode, and said second electrode of said amplifying means.

10. An apparatus according to claim 3 wherein each one of said first and second amplifying means comprises an electron discharge tube having a control grid, a cathode, and a plate, said control grid, said cathode, and said plate being respectively said control electrode, said first electrode, and said second electrode of said amplifying means.

11. An apparatus according to claim 8 wherein each one of said first and second amplifying means comprises an electron discharge tube having a control grid, a cathode, and a plate said control grid, said cathode, and said plate being respectively said control electrode, said first electrode, and said second electrode of said amplifying means.

PO-1050
(5/69)

UNITED STATES PATENT OFFICE
CERTIFICATE OF CORRECTION

Patent No. 3,598,905 Dated August 10, 1971

Inventor(s) Buran I. Keprta, Jr. and Sylvester Walczak, Jr.

It is certified that error appears in the above-identified patent and that said Letters Patent are hereby corrected as shown below:

Claim 5, column 7, line 41, between "voltage" and "comprising " insert --divider--.

Claim 7, column 8, line 21, change "mans" to --means--.

Signed and sealed this 25th day of April 1972.

(SEAL)
Attest:

EDWARD M.FLETCHER,JR.
Attesting Officer

ROBERT GOTTSCHALK
Commissioner of Patents